(12) United States Patent
Woodtke et al.

(10) Patent No.: US 11,392,409 B2
(45) Date of Patent: Jul. 19, 2022

(54) ASYNCHRONOUS KERNEL

(71) Applicant: Apple Inc., Cupertino, CA (US)

(72) Inventors: Shawn R. Woodtke, Richmond (CA);
Peter H. van der Veen, Ottawa (CA);
Stephen J. McPolin, Nepean (CA)

(73) Assignee: Apple Inc., Cupertino, CA (US)

( * ) Notice: Subject to any disclaimer, the term of this patent is extended or adjusted under 35 U.S.C. 154(b) by 805 days.

(21) Appl. No.: 16/071,841

(22) PCT Filed: Jun. 26, 2018

(86) PCT No.: PCT/US2018/039591
§ 371 (c)(1),
(2) Date: Jul. 20, 2018

(87) PCT Pub. No.: WO2019/005864
PCT Pub. Date: Jan. 3, 2019

(65) Prior Publication Data
US 2020/0319921 A1 Oct. 8, 2020

Related U.S. Application Data

(60) Provisional application No. 62/526,311, filed on Jun. 28, 2017.

(51) Int. Cl.
*G06F 7/08* (2006.01)
*G06F 9/48* (2006.01)
(Continued)

(52) U.S. Cl.
CPC .......... *G06F 9/4881* (2013.01); *G06F 9/3836* (2013.01); *G06F 9/544* (2013.01); *G06F 9/545* (2013.01); *G06F 9/546* (2013.01)

(58) Field of Classification Search
CPC ...... G06F 9/4881; G06F 9/3836; G06F 9/544; G06F 9/545; G06F 9/546
See application file for complete search history.

(56) References Cited

U.S. PATENT DOCUMENTS 5,771,383 A 6/1998 Magee et al.
7,404,203 B2 7/2008 Ng
(Continued)

FOREIGN PATENT DOCUMENTS

EP 0695993 A2 2/1996

OTHER PUBLICATIONS

Banino et al. (EP0178235B1, "Electronic method and device for the distributed execution of an activity between a plurality of different sites", Publication Date: Nov. 14, 1990, see attached translation). (Year: 1990).*

(Continued)

*Primary Examiner* — Brian W Wathen
*Assistant Examiner* — Abdou K Seye
(74) *Attorney, Agent, or Firm* — Kowert, Hood, Munyon, Rankin & Goetzel, P.C.; Lawrence J. Merkel

(57) ABSTRACT

In an embodiment, an operating system for a computer system includes a kernel that assigns code sequences to execute on various processors. The kernel itself may execute on a processor as well. Specifically, in one embodiment, the kernel may execute on a processor with a relatively low instructions per clock (IPC) design. At least a portion of other processors in the system may have higher IPC designs, and processors with higher IPC designs may be used to execute some of the code sequences. A given code sequence executing on a processor may queue multiple messages to other code sequences, which the kernel may asynchronously read and schedule the targeted code sequences for execution in response to the messages. Rather than synchronously preparing a message and making a call to send the message, the executing code sequences may continue executing and queuing messages until the code has completed or is in need of a result from one of the messages.

21 Claims, 5 Drawing Sheets

(51) Int. Cl.
G06F 9/38 (2018.01)
G06F 9/54 (2006.01)

(56) References Cited

U.S. PATENT DOCUMENTS

| | | | |
|---|---|---|---|
| 7,490,333 B2 | 2/2009 | Grimaud et al. | |
| 2009/0070552 A1* | 3/2009 | Kanstein | G06F 15/7867 712/29 |
| 2011/0321011 A1* | 12/2011 | Selitser | H04L 67/02 717/120 |

OTHER PUBLICATIONS

Attached Translation of Banino et al. (EP0178235B1, "Electronic method and device for the distributed execution of an activity between a plurality of different sites", Publication Date: Nov. 14, 1990, see attached translation). (Year: 1990).*
Steven Lauterburg et al. ("A Framework for State-Space Exploration of Java-based Actor Programs" (Year: 2009).*
Raphael Hiesgen et al. "OpenCL Actors {Adding Data Parallelism to Actor-based Programming with CAF". (Year: 2017).*
ISR/WO, PCT/2018/039591, mailed Oct. 18, 2018, 11 pages.
Anonymous: "Processor affinity—Wikipedia", Apr. 28, 2017 (Apr. 28, 2017), XP055513312, Retrieved from the Internet: URL:https://en.wikipedia.org/w/index.php? title=Processor_affinity&oldid=777669221[retrieved on Oct. 8, 2018] 3 pages.
Anonymous: "System call—Wikipedia", May 6, 2017 (May 6, 2017), XP055513967, Retrieved from the Internet: URL: https://en.wikipedia.org/w/index.php?title=System_call&oldid=779063533 [retrieved on Oct. 10, 2018] 6 pages.
IPRP, PCT/2018/039591, mailed Jan. 9, 2020, 8 pages.
Graham Hamilton, Panos Kougiouris; "The Spring Nucleus: A Microkernel for Objects," SMLI TR-93-14 The SMLI Technical Report Series, Sun Microsystems Laboratories, Inc. Mountain View, CA 94043 USA Apr. 1993, 15 pages.
QNX Neutrino RTOS System Architecture, QNX Software Development Platform 6.6., QNX Software Systems Limited, 1001 Farrar Road, Ottawa, Ontario, K2K 0B3 Canada, printed from internet, Feb. 20, 2014, 324 pages.
Mach: A New Kernel Foundation For UNIX Development; Mike Accetta, Robert Baron, William Bolosky, David Golub, Richard Rashid, Avadis Tevanian and Michael Young Computer Science Department, Carnegie Mellon University Pittsburgh, Pa. 15213, Apr. 1986, 16 pages.
http://www.oracle.com/technetwork/indexes/documentation/index.html. Sun Microsystems, Inc. 901 San Antonio Road Palo Alto, CA 94303-4900 U.S.A. Documentation Home, ChorusOS 5.0 Features and Architecture Overview,Chapter 2 Architecture and Benefits of the ChorusOS Operating System, printed from the internet, Dec. 18, 2017, 17 pages.

* cited by examiner

ASYNCHRONOUS KERNEL

This application is a 371 of PCT Application No. PCT/US2018/039591, filed Jun. 26, 2018, which claims benefit of priority to U.S. Provisional Patent Application Ser. No. 62/526,311, filed on Jun. 28, 2017. The above applications are incorporated herein by reference. To the extent that any material in the incorporated application conflicts with material expressly set forth herein, the material expressly set forth herein controls.

BACKGROUND

Technical Field

This disclosure relates generally to electronic systems and, more particularly, to operating systems on such electronic systems.

Description of the Related Art

Most electronic systems (e.g. computing systems, whether stand alone or embedded in other devices) have a program which controls access by various other code executing in the system to various hardware resources such as processors, peripheral devices, memory, etc. The program also schedules the code for execution as needed. This program is typically referred to as an operating system.

Typical operating systems schedule programs (represented by a single thread, multiple independently-schedulable threads, or one or more processes) for execution on the processors in the system. The scheduling algorithm generally relies on a static priority between schedulable code, or performs an equal sharing of the processors using a round robin approach or the like. The scheduling is generally synchronous, based on one thread/process calling another thread/process or communicating with another thread/process.

SUMMARY

In an embodiment, an operating system for a computer system includes a kernel that assigns code sequences to execute on various processors. The kernel itself may execute on a processor as well. Specifically, in one embodiment, the kernel may execute on a processor with a relatively low instructions per clock (IPC) design. At least a portion of other processors in the system may have higher IPC designs, and processors with higher IPC designs may be used to execute some of the code sequences. A given code sequence executing on a processor may queue multiple messages to other code sequences, which the kernel may asynchronously read and schedule the targeted code sequences for execution in response to the messages. Rather than synchronously preparing a message and making a call to send the message, the executing code sequences may continue executing and queuing messages until the code has completed or is in need of a result from one of the messages. Performance may be increased, in some embodiments.

BRIEF DESCRIPTION OF THE DRAWINGS

The following detailed description makes reference to the accompanying drawings, which are now briefly described.

Figure 1:
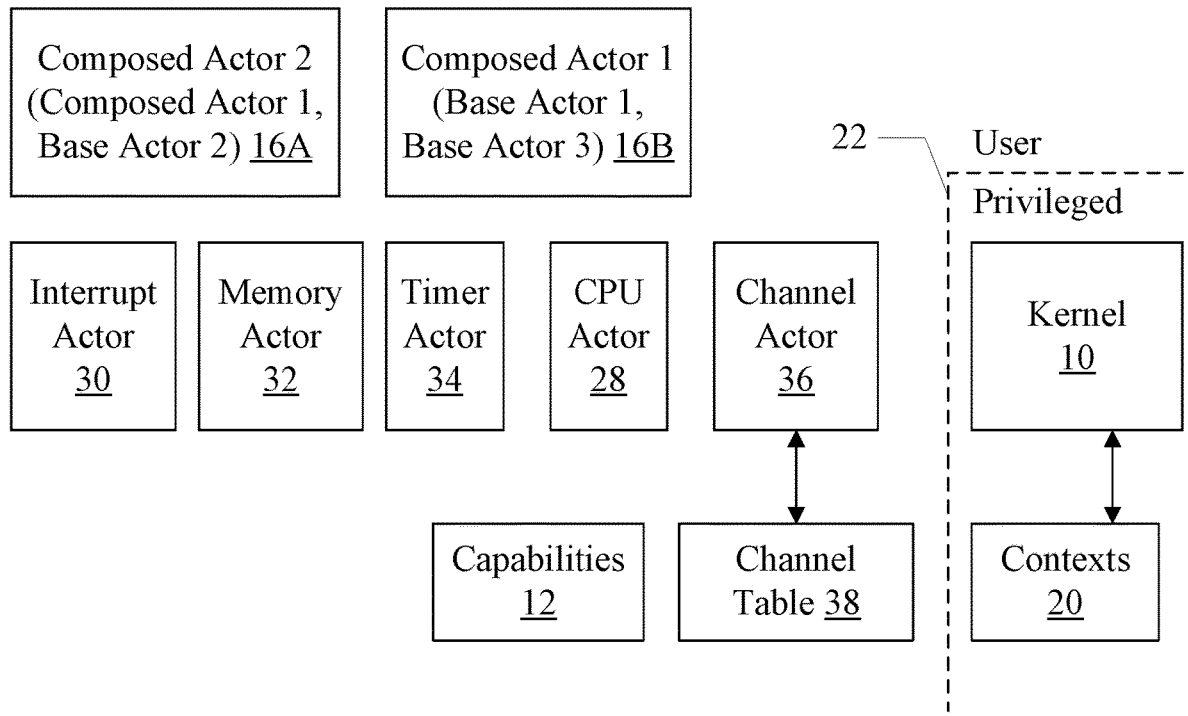
FIG. 1 is a block diagram of one embodiment of an operating system in accordance with this disclosure.

While this disclosure may be susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure. Generally, this disclosure is not intended to refer to one particular implementation, but rather a range of embodiments that fall within the spirit of the present disclosure, including the appended claims.

DETAILED DESCRIPTION OF EMBODIMENTS

An example embodiment is discussed below in which activations of actors are scheduled in response to messages from other actors. In general, the code executed in a given system may include multiple independently-schedulable code sequences. An independently-schedulable code sequence may be any code sequence that is capable of being executed on a processor even if other code sequences are not currently executing (including code sequences with which the independently-schedulable code sequence may interact, e.g. by messages between the sequences, by making function calls between the sequences, etc.). Thus, an independently-schedulable code sequence may be a single-threaded program, a thread from a multi-threaded program, a process, etc. An actor may be an example of an independently-schedulable code sequence, but any other independently-schedulable code sequence may be used.

A given code sequence may be able to communicate with multiple other code sequences and/or may be able to transmit multiple messages to another code sequence without receiving responses in between the messages. Similarly, a given code sequence may be able to continue executing after making a call to another code sequence, even if that other code sequence has not completed execution. In such cases, the given code sequence may queue multiple messages/calls for the kernel of the operating system to process in order to schedule the targeted code sequences for execution on other processors. The kernel may periodically poll the queues, or the given code sequence may issue a Syscall or other instruction once the messages/calls are queued, which may invoke the kernel to process the queue.

Turning now to FIG. 1, a block diagram of one embodiment of an operating system and related data structures is shown. In the illustrated embodiment, the operating system includes a kernel 10, a set of capabilities 12, a set of base actors, and a set of composed actors 16A-16B. The base actors, in this embodiment, may include a central processing unit (CPU) actor 28, an interrupt actor 30, a memory actor 32, a timer actor 34, and a channel actor 36. Other embodiments may include other base actors, including subsets or supersets of the illustrated base actors and/or other actors. The kernel 10 may maintain one or more contexts 20. The channel actor 36 may maintain a channel table 38. There may be any number of base actors and composed actors in a given embodiment.

Each capability 12 includes a function in an address space that is assigned to the capability 12. The data structure for the capability 12 may include, e.g., a pointer to the function in memory in a computer system. In an embodiment, a given capability 12 may include more than one function. In an embodiment, the capability 12 may also include a message mask defining which messages are permissible to send to the capability 12. A given actor which employs the capability 12 may further restrict the permissible messages, but may not override the messages which are not permissible in the capability 12 definition. That is, the capability 12 definition may define the maximum set of permissible messages, from which a given actor may remove additional messages. While message masks are used in some embodiments, any mechanism for identifying valid messages for the capability and further restricting messages in a given actor may be used. The union of the permitted messages may be the permitted messages in the given actor.

Each base actor 28, 30, 32, 34, and 36 may employ one or more capabilities 12. A given actor may employ any number of capabilities, and a given capability may be employed by any number of actors. Because actors 28, 30, 32, 34, and 36 directly employ capabilities 12 and do not include other actors, the actors 30, 32, 34, and 36 may be referred to as base actors. The base actors may provide the low level functions of the operating system. Other actors may be composed actors, such as the actors 16A-16B. Composed actors 16A-16B may be assembled from other actors, either base actors or other composed actors. Any amount of assembly may be permitted in various embodiments (e.g. composed actors may include other actors that are themselves composed actors, which may further include actors that are themselves composed actors, etc.). In an embodiment, a composed actor 16A-16B may employ additional capabilities 12 as well. In an embodiment, the operating system disclosed herein may be viewed as a lightweight capability system, as the structure to access the capability may simply be one or more pointers to the capability function. This differs from the use of keys and tree spanning access methods that some capability-based systems use.

Accordingly, an actor may generally be defined as a container for one or more capabilities, either directly employed or employed via the inclusion of another actor. A container may be any type of data structure, class, data type, etc. that can store data allowing the capabilities to be accessed/executed. For example, a data structure with pointers to capabilities (or to other actors which point to the capabilities in a pointer chain) may be one form of container. More generally, a container may be any structure that organizes a group of objects in a defined way that follows specific access rules. In an embodiment, actors may be compiled into the operating system and may be optimized to limit the number of exceptions that may occur (e.g. by merging code into the actor, allowing some or all of the actor to execute in privileged space, etc.). When the code is merged together, the exception in the code one actor that would have lead to execution of code in another actor may be eliminated since the code has been merged. However, the model that the operating system is designed to may be that the actor is a container and may be proven to be safe and stable. Then, the compiled version may be shown to be equivalent to the model and thus also safe and stable. Safety and stability may be critical in certain products in which the operating system may be employed. For example, the operating system may be in a computing system that is embedded in the product. In one particular case, the product may be a vehicle and the embedded computing system may provide one or more automated navigation features. The vehicle may include many include any type of vehicle such as an aircraft, boat, automobile, recreational vehicle, etc. In some embodiments, the automated navigation features may automate any portion of navigation, up to and including fully automated navigation in at least one embodiment, in which the human operator is eliminated. Safety and stability may be key features of such an operating system. Additionally, security of the operating system may be key in such cases, as an attack which disables or destabilizes the system may disable the vehicle or possibly even cause a crash. In a traditional monolithic kernel operating system, the one operating system entity (the kernel) is responsible for all functions (memory, scheduling, I/O, time, thread management, interrupts, etc.). Any compromise in any of the functions could compromise the whole system. In the present operating system, however, the entities are separated and communicate via channels that do not permit compromise. Each entity may be provided with as much privileged and as needed to complete its operation. Thus, a compromise of one entity may not compromise the system and the leakage of privileged that often occurs in the monolithic kernel is not possible.

In an embodiment, the operating system may be a real time operating system that is designed to complete tasks within specified time intervals, so that the system may respond quickly enough to manage events that are occurring in "real time" (e.g. without undue buffering or other delays). For example, in the automated navigation functions mentioned above, the system may be able to react quickly enough to inputs in order to effectuate corresponding automated navigation outputs to keep the vehicle operating in a safe manner.

The dotted line 22 divides the portion of the operating system that operates in user mode (or space) and the portion that operates in privileged mode/space. As can be seen in FIG. 1, the kernel 10 is the only portion of the operating system that executes in the privileged mode in this embodiment. The remainder of the operating system executes in the user mode. Privileged mode may refer to a processor mode (in the processor executing the corresponding code) in which access to protected resources is permissible (e.g. control registers of the processor that control various processor features, certain instructions which access the protected resources may be executed without causing an exception, etc.). In the user mode, the processor restricts access to the protected resources and attempts by the code being executed to change the protected resources may result in an exception. Read access to the protected resources may not be permitted as well, in some cases, and attempts by the code to read such resources may similarly result in an exception. Because most of the operating system executes in the user space, the user mode protections may apply. Thus, "privilege leak," where privileged code that is expected to access only certain protected resources but actually accesses others through error or nefarious intent, may be much less likely in the disclosed embodiments. Viewed in another way, each entity in the system may be given the least amount of privileged possible for the entity to complete its intended operation.

Moreover, the kernel 10 may be responsible for creating/maintaining contexts 20 for actors and assigning actors to execute on various processors in the computer system, but may include no other functionality in this embodiment. Thus, in an embodiment, the kernel 10 may be viewed as a form of microkernel. The contexts 20 may be the data which the processor uses to resume executing a given code sequence. It may include settings for certain privileged registers, a copy of the user registers, etc., depending on the instruction set architecture implemented by the processor. Thus, each actor may have a context (or may have one created for it by the kernel 10, if it is not active at the time that another actor attempts to communicate with it).

The CPU actor 28 may represent the processors in the system that act as the CPUs. Generally, the CPUs may be the "main processors" in a system and may execute the components of the operating system, such as the various base actors and composed actors shown in FIG. 1. The CPUs may also execute other code sequences such as threads of application programs. The CPU actor 28 may be a mechanism for other actors to access processor state, for example.

The interrupt actor 30 may be responsible for handling interrupts in the system (e.g. interrupts asserted by devices in the system to the processor, or processor's assertions to other processors). In an embodiment, the interrupt actor 30 may be activated by the kernel 10 in response to interrupts (as opposed to exceptions that occur within a processor in response to internal processor operation/instruction execution). The interrupt actor 30 may gather information about the interrupt (e.g. from an interrupt controller in the computing system on which the operating system executes, interrupt controller not shown) and determine which actor in the system should be activated to respond to the interrupt (the "targeted actor" for that interrupt). The interrupt actor 30 may generate a message to the targeted actor to deliver the interrupt.

The memory actor 32 may be responsible for managing memory, providing access to memory when requested by other actors and ensuring that a given memory location is only assigned to one actor at a time. The memory actor 32 may operate on physical memory. Other actors may be implemented to, e.g., provide a virtual memory system. Such actors may use the memory actor 32 to acquire memory as needed by the virtual memory system. That is, such actors may be composed actors that incorporate the memory actor 32 and other functions (e.g. capabilities, or capabilities in other actors).

The timer actor 34 may be responsible for implementing a timer in the system. The timer actor 34 may support messages to read the timer, set an alarm, etc.

The channel actor 36 may be responsible for creating and maintaining channels between actors. Channels may be the communication mechanism between actors for control messages. Data related to the control messages may be passed between actors in any desired fashion. For example, shared memory areas, ring buffers, etc. may be used.

In an embodiment, an actor may create a channel on which other actors may send the actor messages. The channel actor 36 may create the channel, and may provide an identifier (a channel identifier, or Cid) to the requesting actor. The Cid may be unique among the Cids assigned by the channel actor 36, and thus may identify the corresponding channel unambiguously. The requesting actor may provide the Cid (or "vend" the Cid) to another actor or actors, permitting those actors to communicate with the actor. In an embodiment, the requesting actor may also assign a token (or "cookie") to the channel, which may be used by the actor to verify that the message comes from a permitted actor. That is, the token may verify that the message is being received from an actor to which the requesting actor gave the Cid (or another actor to which that actor passed the Cid). In an embodiment, the token may be inaccessible to the actors to which the Cid is passed, and thus may be unforgeable. For example, the token may be maintained by the channel actor 36 and may be inserted into the message when an actor transmits the message on a channel. Alternatively, the token may be encrypted or otherwise hidden from the actor that uses the channel. In an embodiment, the token may be a pointer to a function in the channel-owning actor (e.g. a capability function or a function implemented by the channel-owning actor).

The channel actor 36 may track various channels that have been created in a channel table 38. The channel table 38 may have any format that permits the channel actor to identify Cids and the actors to which they belong. When a message having a given Cid is received from an actor, the channel actor 36 may identify the targeted actor (the actor that is to receive the message) via the Cid. The channel actor 36 may request activation of the targeted actor and may relay the message to the targeted actor.

An activation of an actor may be an instantiation of an actor to process a message. Each activation may have an associated context 20, that is created when the activation begins execution. Once the activation completes execution on the message, the activation terminates (or is "destroyed"). The context 20 may be deleted when the activation is destroyed. A new execution of the actor may then cause a new activation.

In an embodiment, each actor/capability within an actor may be activated to respond to a given message. The activation may be associated with a context 20, which may be created for the activation if a context for the actor does not yet exist in the contexts 20. Once the activation has completed processing the message, the actor may dissolve, or dematerialize, or destroy itself. The dissolving may include deleting the context and closing the thread. Thus, there may be not persistent threads in the system. Each thread may be activated when needed, and dissolve when complete. In other embodiments, threads may be created for each actor/capability. The threads may block, but remain live in the system, after completing processing of a message. Accordingly, the thread may be initialized already, and may have a context 20, when a given message is received for that thread to processor. Unless expressly tied to activation/dissolution herein, various features disclosed herein may be used with the longer-living threads. In such embodiments, an activation may be similar to unblocking a thread and a dissolve may be similar to blocking a thread.

Figure 2:
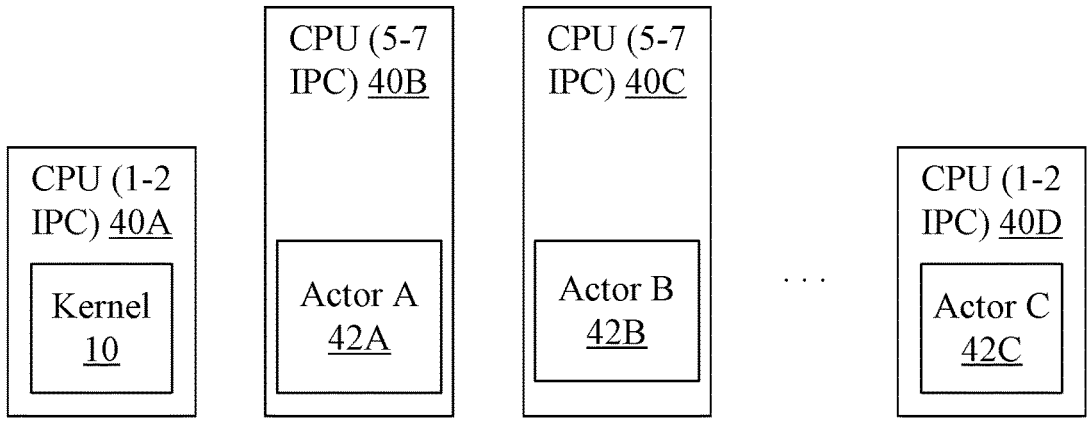
FIG. 2 is a block diagram of one embodiment of multiple processors used as central processing units (CPUs) in a system.

In another embodiment, one or more of the base actors (e.g. one or more of the actors 28, 30, 32, 34, and 36) may execute in the privileged mode/space (e.g. on the same side of the dotted line 22 as the kernel 10 in FIG. 2).

FIG. 2 is a block diagram of a set of processors 40A-40D that may be included in one embodiment of a computer system. Any number of processors 40A-40D may be provided in various embodiments. As illustrated in FIG. 2, the processors 40A-40D may be CPUs in the system. At the point in time illustrated in FIG. 2, the processor 40A may be executing the kernel 10 and the processors 40B-40D may be executing various other actors 42A-42C. The actors 42A-42C may be representative of any of the base actors and/or composed actors in the system.

As illustrated in FIG. 2, the processors 40A-40D may have different design points in terms of performance. One measure of performance is the number of instructions per clock cycle (IPC) that the processor 40A-40D may execute. For example, processors 40A and 40D may be designed for an IPC in the range of the 1-2, while the processors 40B-40C may be designed for an IPC in the range of 5-7. However, these IPCs are merely examples and any IPCs may be used in other embodiments. Any mix of lower IPC processors and higher IPC processors may be used, and there may be more than two IPCs in the mix of processors 40A-40D.

The IPC may be a maximum number of concurrently executable instructions. Depending on the code being executed, the actual number of instructions executed in a given clock cycle may be lower due to a lack of availability of instructions to execute in parallel. For example, high IPC processors employ advanced branch prediction and other speculative execution mechanisms to identify instructions for execution. Code sequences with many hard-to-predict branch instructions may result in low IPC counts during execution of those sequences. Additionally, high IPC processors may be higher power consumers than low IPC processors. Attempting to execute code sequences that may not provide for high IPC execution on a high IPC processor may waste power. Furthermore, instructions such as the Syscall instruction mentioned below, when executed, cause an exception. The overhead to clear the pipeline of the incorrectly speculated instructions that follow the Syscall, repair the prediction structures and other speculative mechanisms, and vector to the exception may introduce significant delay, reducing performance. If the exceptions occur too frequently, the performance loss may be unacceptable.

In an embodiment, the kernel 10 may be a code sequence that is unlikely to experience high IPC execution. The kernel 10 may often perform pointer-chasing branch instructions, for example, which are hard to predict. Accordingly, the kernel 10 may be executed on a low IPC processor such as processor 40A. Executing the kernel 10 on the processor 40A may be power efficient, since the kernel 10 may not be amenable to high IPC execution. Furthermore, the performance of the kernel on the processor 40A may be similar to the performance experienced on a higher IPC processor. In one embodiment, the kernel 10 may be executed on the processor 40A whenever it is being executed. That is, the kernel 10 may not execute on another processor 40B-40D. In some embodiments, the processor 40A may execute other code when the kernel 10 is idle. In other embodiments, the processor 40A may be dedicated to executing the kernel 10. If the kernel 10 is idle, the processor 40A may enter a low power state such as a sleep state, in such embodiments. The kernel 10 may be said to be "pinned" to the processor 40A if it executes on the processor 40A to the exclusion of other processors 40B-40D in the system. Additionally, an asynchronous messaging system between the kernel 10 and the actors may permit the kernel 10 to execute on a separate processor and still manage the actors.

The kernel 10, when activating a given actor such as the actors 42A-42C, may assign the given actor to a processor 40B-40D to execute. Assigning an actor to a processor may be based on any criteria. For example, one or more of the following may be considered: availability of the processor (e.g. it is not overloaded with other actors), profile information about the actor (e.g. provided by the programmer, indicating if it can take advantage of high IPC processors), power consumption in the system, etc. Generally speaking, an actor may be "assigned" to a processor if it is being executed, or will be executed, on that processor. In an embodiment, once an activation of an actor is assigned to a processor, it may remain on that processor until the activation completes and destroys itself. The activation may be suspended to execute another activation (or a portion of the other activation), but may complete on the processor to which it is assigned.

While the embodiment of FIG. 2 illustrates processors 40A-40D having different IPCs, other embodiments may have processors 40A-40D that have the same IPC (e.g. may be the same instruction set architecture and performance). Other embodiments may be asymmetrical (e.g. one or more of the processors 40A-40D may implement a different instruction set architecture than the others). Generally, the processors 40A-40D may be asymmetrical or symmetrical, and may be implemented a different performance points or the same performance point, in any combination.

Figure 3:
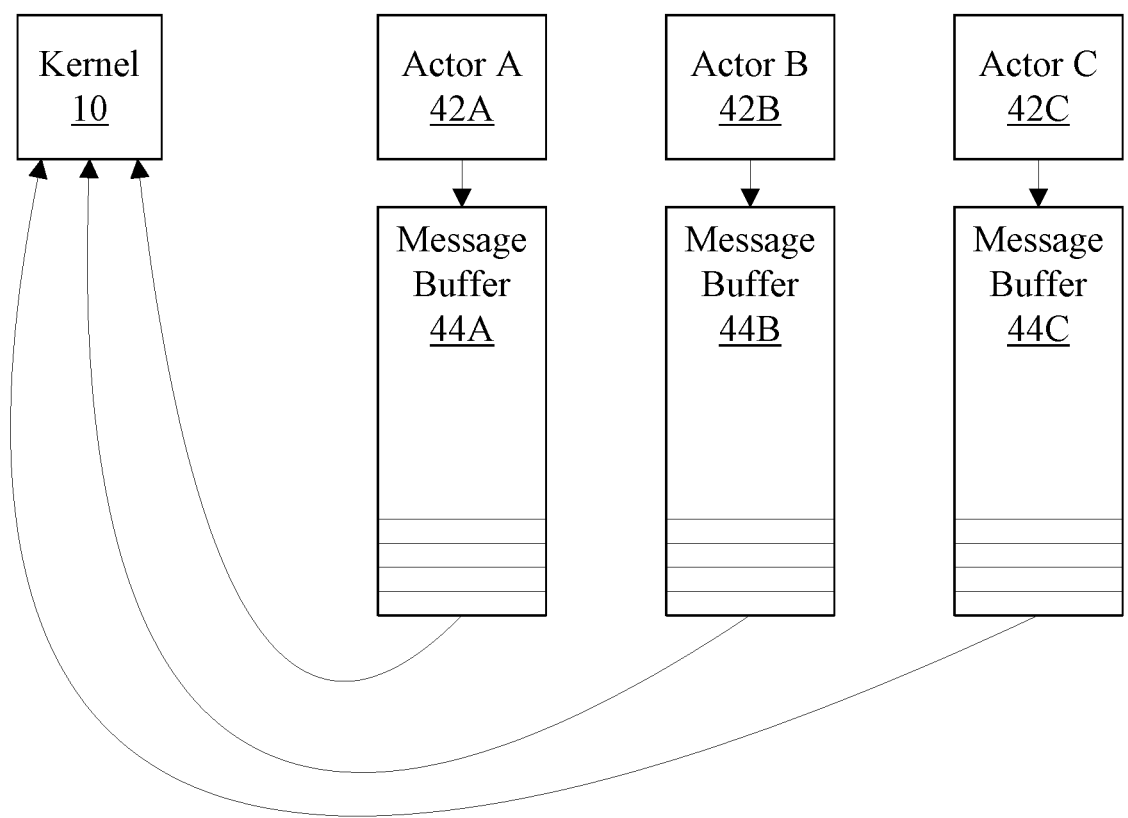
FIG. 3 is a block diagram one embodiment various executing actors and message buffers for messages to be transmitted to other actors.

FIG. 3 is a block diagram of one embodiment of the kernel 10 and the actors 42A-42C, along with message buffers 44A-44C. Each message buffer 44A-44C corresponds to a respective one of the actors 42A-42C, as shown in FIG. 3. The actor 42A-42C may write messages to the respective buffer 44A-44C. The kernel 10 may read the messages and process them to assign actors targeted by the messages to processors to execute.

The kernel 10 may read the message buffers 44A-44C and may activate targeted actors asynchronous to the actors 42A-42C writing the messages to the message buffers 44A-44C. In some embodiments, the kernel 10 may periodically poll the message buffers 44A-44C for messages. Alternatively or in addition, an actor may determine that it has completed writing messages to the message buffers or the message buffers are full, and may cause an exception to initiate processing of the messages or otherwise communicate to the kernel 10 that the messages are ready to be processed. For example, a Syscall instruction may be executed by the actors to cause the exception. The Syscall instruction may be a privileged instruction, which would cause an exception if executed in the user space, or may be an illegal instruction. Other embodiments may employ other mechanisms. In an embodiment, a portion of the kernel may execute on the processors 40B-40D in response to the exception, or a separate kernel may execute in response to the exception, to transmit a notification to the kernel 10 that the messages in the corresponding message buffer 44A-44C are ready to execute. The portion of the kernel/separate kernel may also be responsible for loading context into the processors 40B-40D to execute an activation assigned to the processor 40B-40D.

Figure 4:
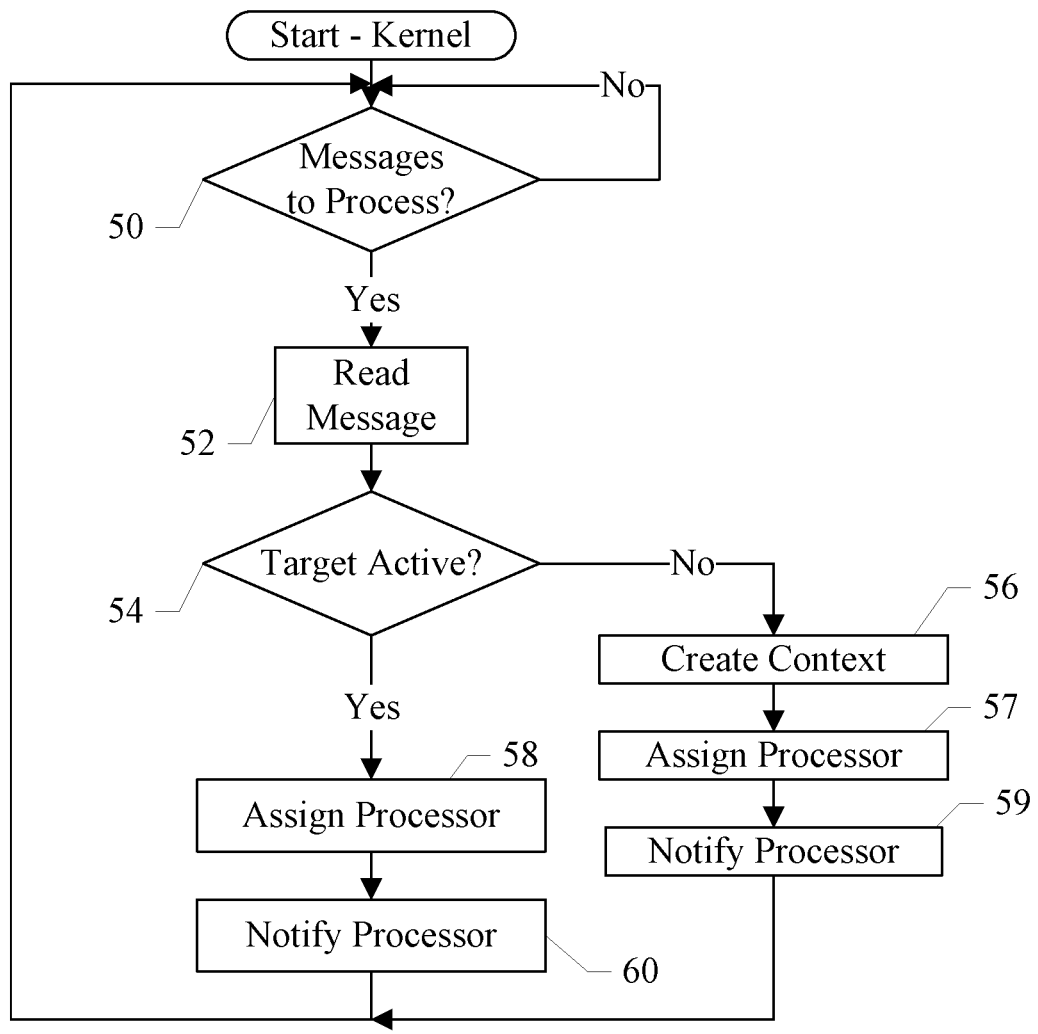
FIG. 4 is a flowchart illustrating operation of one embodiment of the kernel to schedule actors based on messages between actors.

FIG. 4 is a flowchart illustrating one embodiment of the kernel 10 to process messages from the message buffers 44A-44C. While the blocks are shown in a particular order for ease of understanding, other orders may be used. The kernel 10 may include instructions which, when executed in a computer system, may implement the operation shown in FIG. 4. That is, the kernel 10 may be configured to implement the operation shown in FIG. 4.

If there are messages in one or more message buffers 44A-44C to process (decision block 50, "yes" leg), the kernel 10 may read a message (block 52). The determination of whether or not there are messages to process may be in response to an exception from an actor 42A-42N, or may be performed periodically by the kernel 10, or both, in various embodiments. From the message, the kernel 10 may detect the target actor. If the target actor is not active (and thus has no context in the contexts 20—decision block 54, "no" leg), the kernel 10 may create a context for the target actor (block 56). The kernel may assign a processor to execute the actor, and may notify the processor that the context is ready for loading and execution (blocks 57 and 59). The notification may be in the form of a message to the kernel portion/separate kernel that may execute on the assigned processor, an interprocessor interrupt, etc. If the target actor is active, the kernel 10 may assign a processor to execute the target actor (if necessary), and may notify the processor that the context is ready for loading and execution (blocks 58 and 60).

It is noted that, in some embodiments, the channel actor 36 may process messages to route them to target actors. The channel actor 36 may continue to perform this operation in some embodiments. The kernel 10 may process the messages to assign processors and manage contexts, as discussed above. Alternatively, the actors 42A-42C may write the message buffers 44A-44C with an identifier of the target actor, so that the kernel 10 may assign target actors to processors. In another alternative, the channel actor 36 may process messages asynchronously and provide target actor identifiers to the kernel 10.

In embodiments in which threads stay alive but block when processing of a message is completed, operation similar to that shown in FIG. 4 may be implemented except that context creation need not be performed and a thread may be unblocked to perform the processing.

Figure 5:
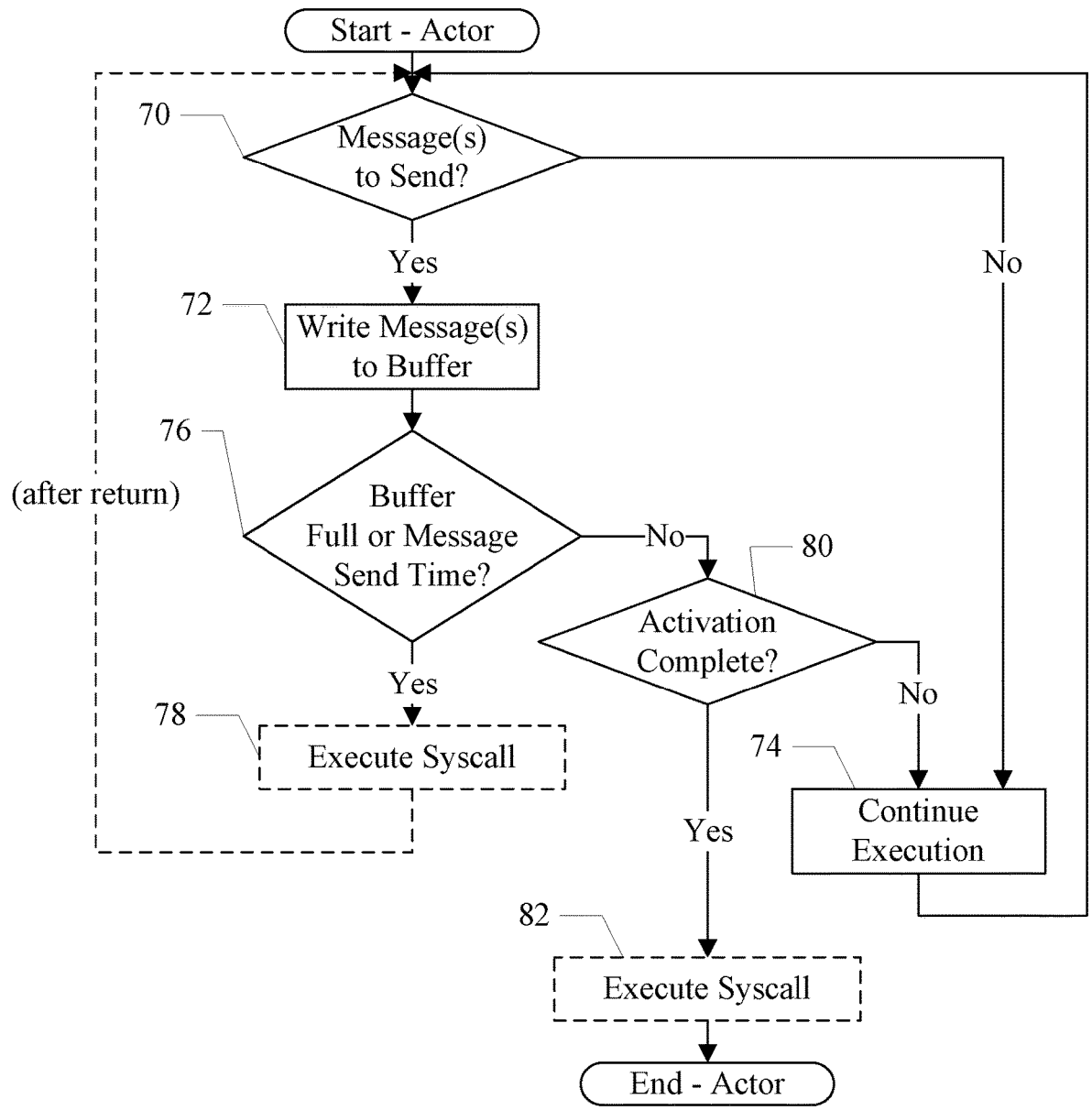
FIG. 5 is a flowchart illustrating operation of one embodiment of an actor to queue messages to another actor.

FIG. 5 is a flowchart illustrating one embodiment of an actor 42A-42C to write messages to a message buffer 44A-44C. While the blocks are shown in a particular order for ease of understanding, other orders may be used. The actor 42A-42C may include instructions which, when executed in a computer system, may implement the operation shown in FIG. 5. That is, the actor 42A-42C may be configured to implement the operation shown in FIG. 5.

If the actor 42A-42C has one or more messages to send to other actors (decision block 70, "yes" leg), the actor 42A-

42C may write the message(s) to the corresponding message buffer 44A-44C (block 72). If there are no messages to send (decision block 70, "no" leg), the actor 42A-42C may continue execution (block 74). Thus, the messages may be written by the actor 42A-42C to the corresponding message buffer 44A-44C intermittently during execution. If the buffer is full or it is otherwise time to inform the kernel 10 of the messages (decision block 76, "yes" leg), the actor 42A-42C may optionally execute a Syscall instruction (block 78), and may continue execution after being restarted by the kernel 10. Otherwise (decision block 76, "no" leg), the actor 42A-42C may continue execution.

Various embodiments of actors 42A-42C may have any number of reasons for the actors 42A-42C to determine that is time to send the messages in the message buffers 44A-44C, in addition to buffer fullness. For example, an actor 42A-42C may determine periodically that the messages should be sent. That is, the actor 42A-42C may determine that the messages should be sent responsive to an elapse of a predetermined period of time. An actor 42A-42C may need the result of a message, as another example.

Another case in which the messages in one of the message buffers 44A-44C are ready to be sent when the activation of an actor 42A-42C is completing execution, and will be destroyed, which may cause the corresponding message buffer 44A-44C to be deallocated from the memory. If the activation is complete (decision block 80, "yes" leg), the actor 42A-42C may optionally execute a Syscall instruction (block 82). The messages may be sent prior to termination, or at least prior to destroying the activation's context.

Figure 6:
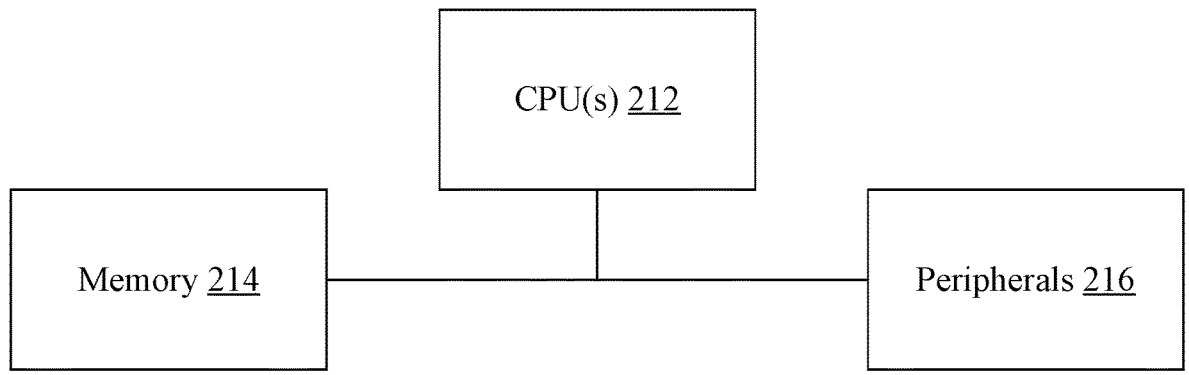
FIG. 6 is a block diagram of one embodiment of a computer system.

Tuning now to FIG. 6, a block diagram of one embodiment of an exemplary computer system 210 is shown. In the embodiment of FIG. 6, the computer system 210 includes at least one processor 212, a memory 214, and various peripheral devices 216. The processor 212 is coupled to the memory 214 and the peripheral devices 216.

The processor 212 is configured to execute instructions, including the instructions in the software described herein such as the various actors, capabilities functions, and/or the kernel. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor. The processor 212 may be the CPU (or CPUs, if more than one processor is included) in the system 210. The processor 212 may be a multi-core processor, in some embodiments. The processor 212 may include the processors 40A-40D shown in FIG. 2.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridges may be used to couple the processor 212, the memory 214, and the peripheral devices 216.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use, data to be operated upon by the processor 212 during use, etc.

Figure 7:
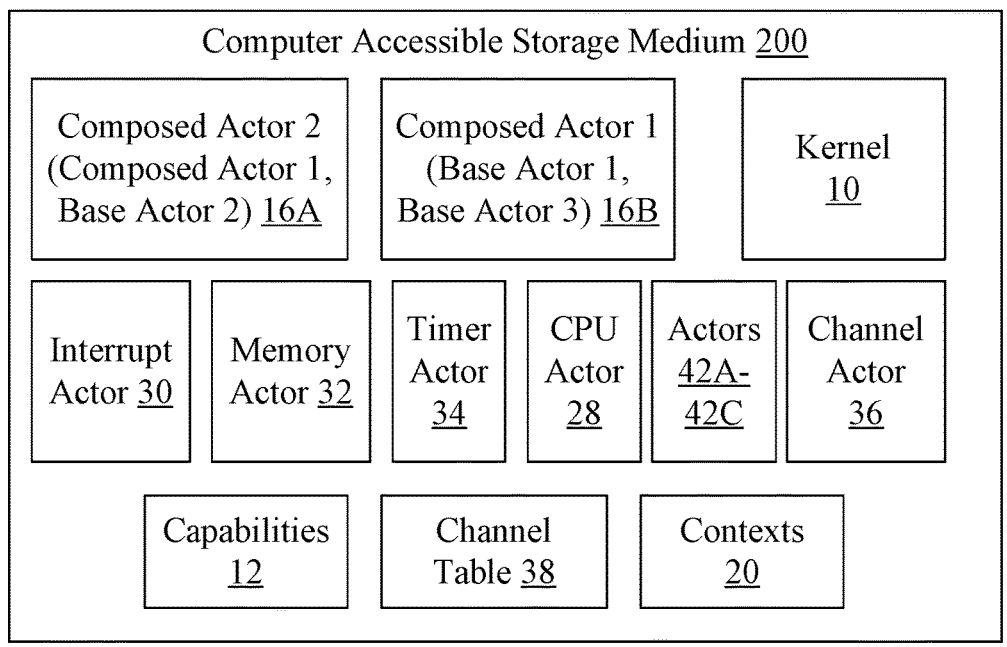
FIG. 7 is a block diagram of one embodiment of a computer accessible storage medium.

Peripheral devices 216 may represent any sort of hardware devices that may be included in the computer system 210 or coupled thereto (e.g. storage devices, optionally including a computer accessible storage medium 200 such as the one shown in FIG. 7), other input/output (I/O) devices such as video hardware, audio hardware, user interface devices, networking hardware, various sensors, etc.). Peripheral devices 216 may further include various peripheral interfaces and/or bridges to various peripheral interfaces such as peripheral component interconnect (PCI), PCI Express (PCIe), universal serial bus (USB), etc. The interfaces may be industry-standard interfaces and/or proprietary interfaces. In some embodiments, the processor 212, the memory controller for the memory 214, and one or more of the peripheral devices and/or interfaces may be integrated into an integrated circuit (e.g. a system on a chip (SOC).

The computer system 210 may be any sort of computer system, including general purpose computer systems such as desktops, laptops, servers, etc. The computer system 210 may be a portable system such as a smart phone, personal digital assistant, tablet, etc. The computer system 210 may also be an embedded system for another product.

FIG. 7 is a block diagram of one embodiment of a computer accessible storage medium 200. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 7 may store code forming the various actors 16A-16B, 28, 30, 32, 34, 36, and 40A-42D, the kernel 10, and/or the functions in the capabilities 12. The computer accessible storage medium 200 may still further store one or more data structures such as the channel table 38 and/or the contexts 20. The various actors 16A-16C, 28, 30, 32, 34, 36, and 40A-40D, the kernel 10, and/or the functions in the capabilities 12 may comprise instructions which, when executed, implement the operation described above for these components. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A system comprising:
a plurality of processors and
a non-transitory computer accessible storage medium storing a plurality of instructions including a kernel, wherein the kernel is executed by a first processor of the plurality of processors at any time that the kernel is being executed in the system, and wherein the kernel, when executed:
assigns a plurality of code sequences to execute on other ones of the plurality of processors, wherein the plurality of code sequences inter-communicate via messages, when executed, and wherein a first code sequence of the plurality of code sequences writes a plurality of messages to a buffer in memory, when executed;
assigns a second code sequence of the plurality of code sequences to execute on a third processor of the plurality of processors responsive to a first message in the buffer targeting the second code sequence; and
the assignment of the second code sequence by the kernel is asynchronous to the write of the first message to the buffer.

2. The system as recited in claim 1 wherein the first code sequence, when executed on one of the other ones of the plurality of processors, causes an exception subsequent to writing the plurality of messages to the buffer.

3. The system as recited in claim 2 wherein the exception occurs due to an attempt to execute a system call instruction.

4. The system as recited in claim 1 wherein the kernel, when executed, examines a content of the buffer asynchronous to the first code sequence writing to the buffer and during a time that the first code sequence continues executing.

5. The system as recited in claim 1 wherein the first code sequence, when executed, writes the plurality of messages to the buffer intermittently during execution and continues execution subsequent to writing a given message of the plurality of messages without interruption associated with writing the given message.

6. The system as recited in claim 1 wherein a third code sequence of the plurality of code sequences executing on a fourth processor of the plurality of processors, when executed, writes a second plurality of messages to a second buffer, and wherein the kernel, when executed, asynchronously processes the second plurality of messages.

7. The system as recited in claim 1 wherein the kernel, when executed, creates a context for the second code sequence and causes the third processor to load the context responsive to assigning the third processor to the second code sequence.

8. The system as recited in claim 1 wherein at least the first processor of the plurality of processors is designed to execute a lower number of instructions per clock cycle than at least a second processor of the plurality of processors.

9. The system as recited in claim 1 wherein the buffer is assigned to the first code sequence and other ones of the plurality of messages target other code sequences of the plurality of code sequences.

10. A system comprising:
a plurality of processors;
a memory, wherein a plurality of buffers are allocated in the memory; and
a non-transitory computer accessible storage medium storing a plurality of instructions including a kernel, wherein the kernel is pinned to a first processor of the plurality of processors for execution, and wherein the kernel, when executed:
assigns a plurality of code sequences to execute on other ones of the plurality of processors, wherein the plurality of code sequences inter-communicate via messages, when executed, and wherein each buffer of the plurality of buffers is associated with a respective code sequence of the plurality of code sequences, wherein the respective code sequence writes a plurality of messages to the associated buffer, when executed; and
asynchronously processes the plurality of messages in the associated buffer.

11. The system as recited in claim 10 wherein the kernel, when executed, periodically reads the associated buffer to asynchronously process the plurality of messages during a time that the respective code sequence continues executing.

12. The system as recited in claim 11 wherein the kernel, when executed, generates a context for one of the plurality of processors responsive to assigning one of the plurality of code sequences to execute on the one of the plurality of processors.

13. The system as recited in claim 12 wherein, if the one of the plurality of code sequences is suspended and subsequently restarted, the one of the plurality of code sequences is restarted on the one of the plurality of processors to which it was assigned.

14. The system as recited in claim 10 wherein the respective code sequence causes an exception, when executed, to signal the kernel that the plurality of messages in the associated buffer are ready to process.

15. The system as recited in claim 14 wherein the respective code sequence causes the exception responsive to the messages filling the associated buffer.

16. The system as recited in claim 14 wherein the respective code sequence causes the exception responsive to determining that the plurality of messages are ready to be processed.

17. The system as recited in claim 16 wherein the respective code sequence determines that the plurality of messages are ready to be transmitted responsive to an elapse of time.

18. The system as recited in claim 16 wherein the respective code sequence determines that the plurality of messages are ready to be transmitted responsive to the respective code sequence depending on a result of processing one or more of the plurality of messages.

19. A non-transitory computer accessible storage medium storing a plurality of instructions forming a kernel which, when executed on a first processor of a plurality of processors in a computer system:
assigns a plurality of code sequences to execute on other ones of the plurality of processors, wherein the plurality of code sequences inter-communicate via messages, when executed, and wherein a first code sequence of the plurality of code sequences writes a plurality of messages to a buffer in memory, when executed;
assigns a second code sequence of the plurality of code sequences to execute on a third processor of the plurality of processors responsive to a first message in the buffer targeting the second code sequence; and
the assignment of the second code sequence is asynchronous to the write of the first message to the buffer.

20. The non-transitory computer accessible storage medium as recited in claim 19 wherein the kernel, when executed, examines a content of the buffer asynchronous to the first code sequence writing to the buffer and during a time that the first code sequence continues executing.

21. The non-transitory computer accessible storage medium as recited in claim 19 wherein the kernel, when executed, creates a context for the second code sequence and causes the third processor to load the context responsive to assigning the third processor to the second code sequence.

\* \* \* \* \*